INVENTOR
RENATO CARETTA

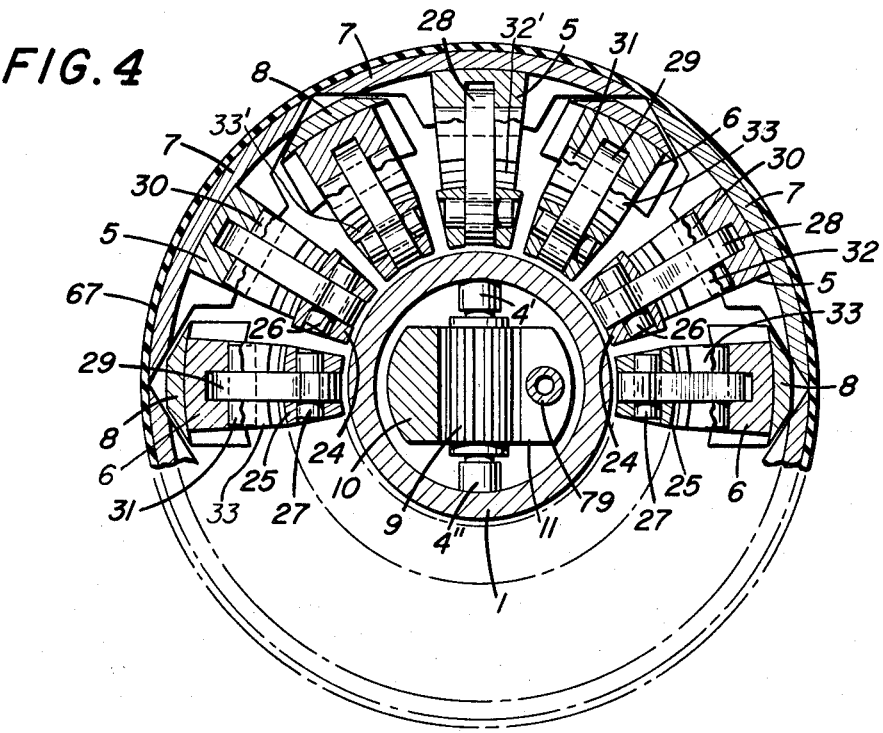
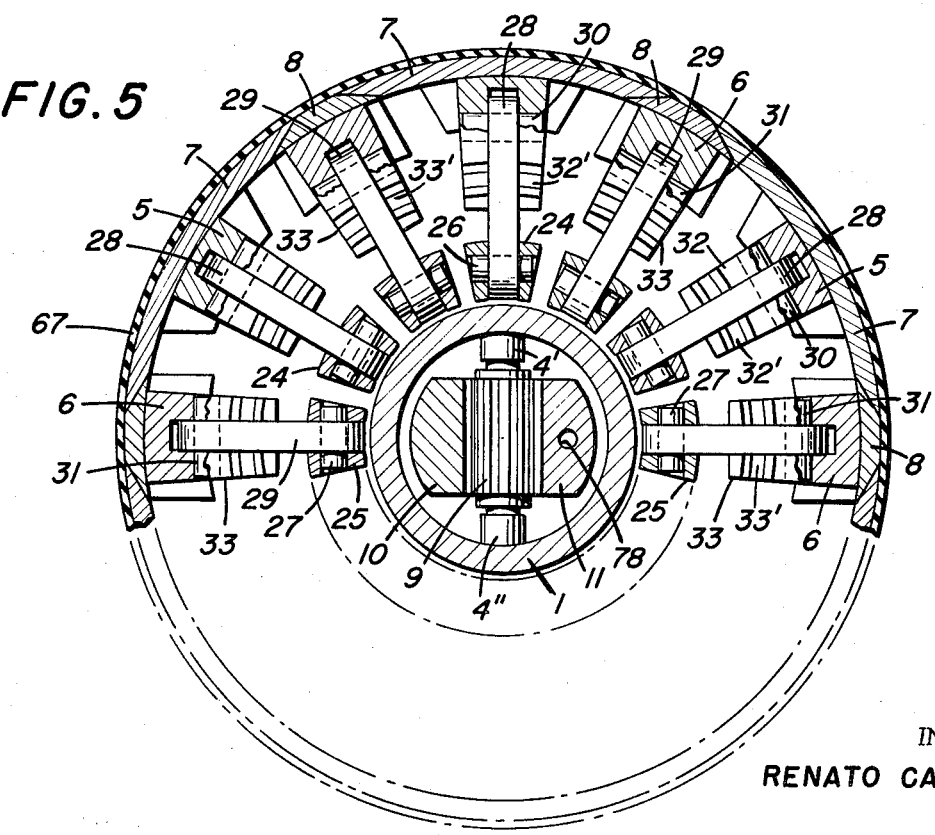

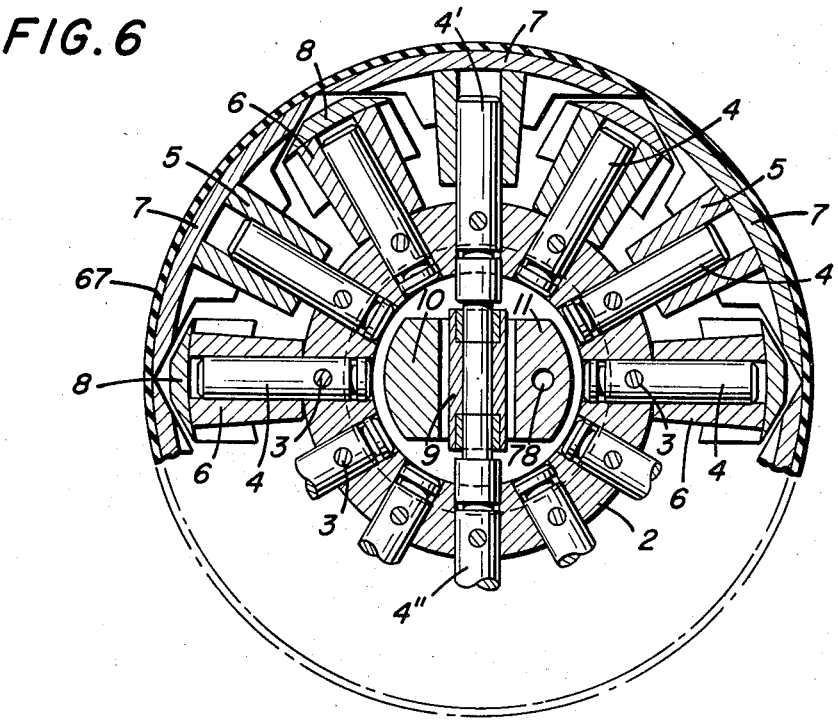

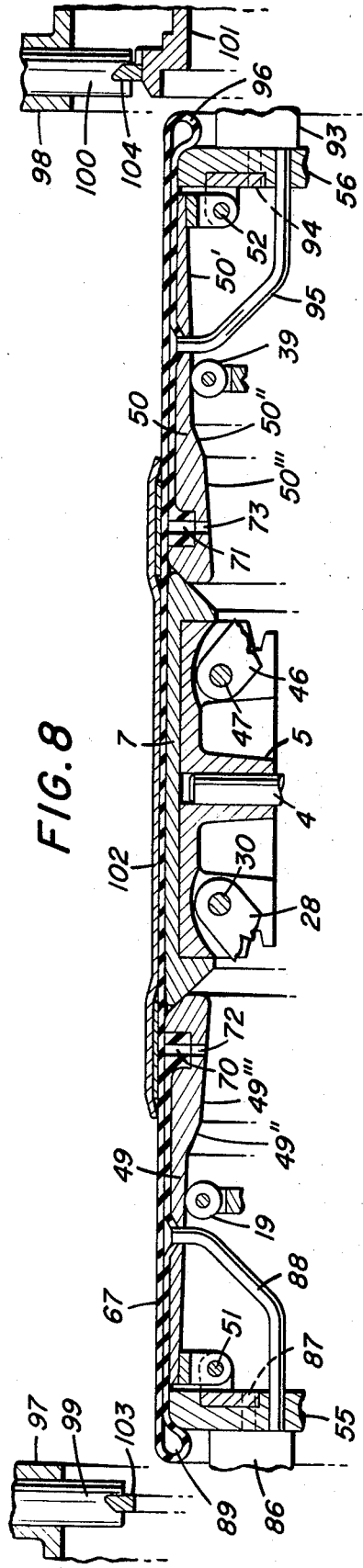
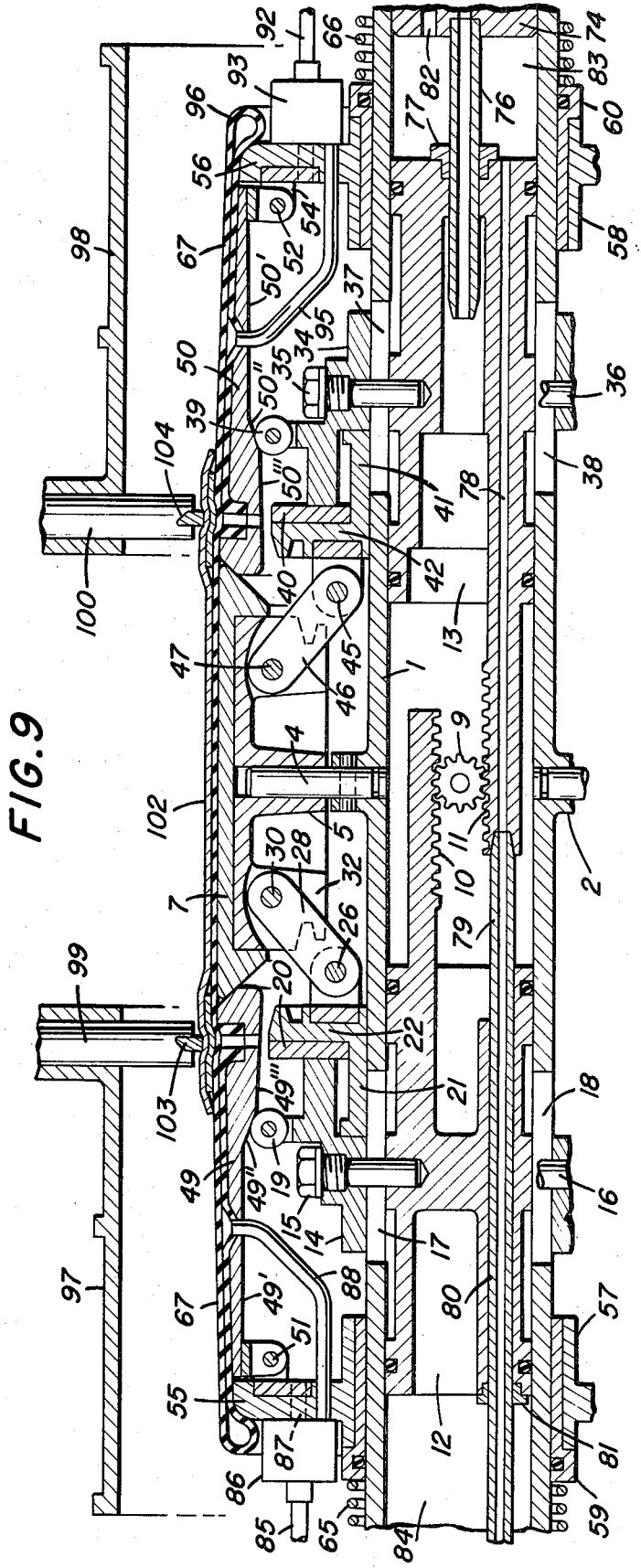
FIG. 8
FIG. 9

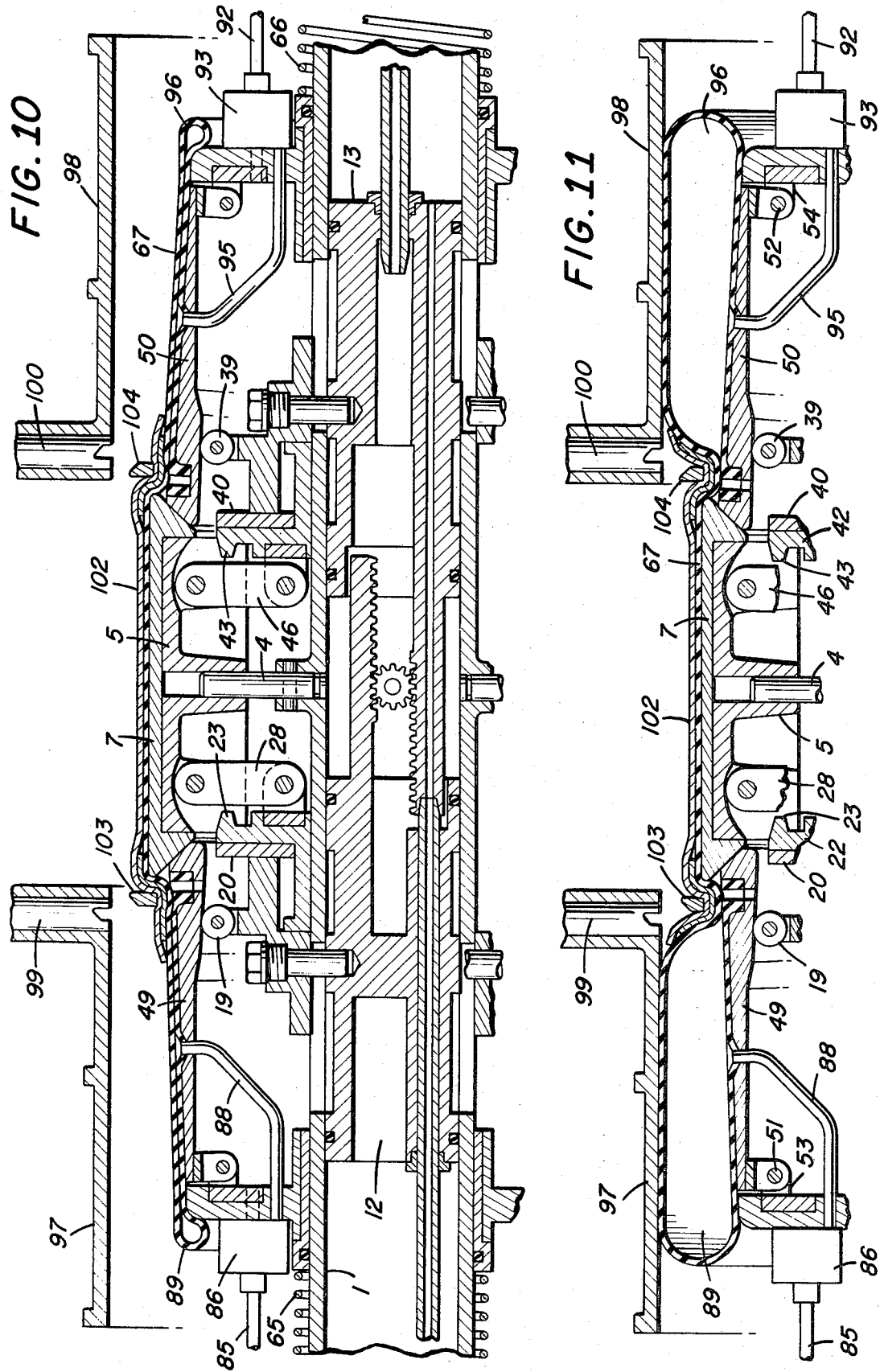

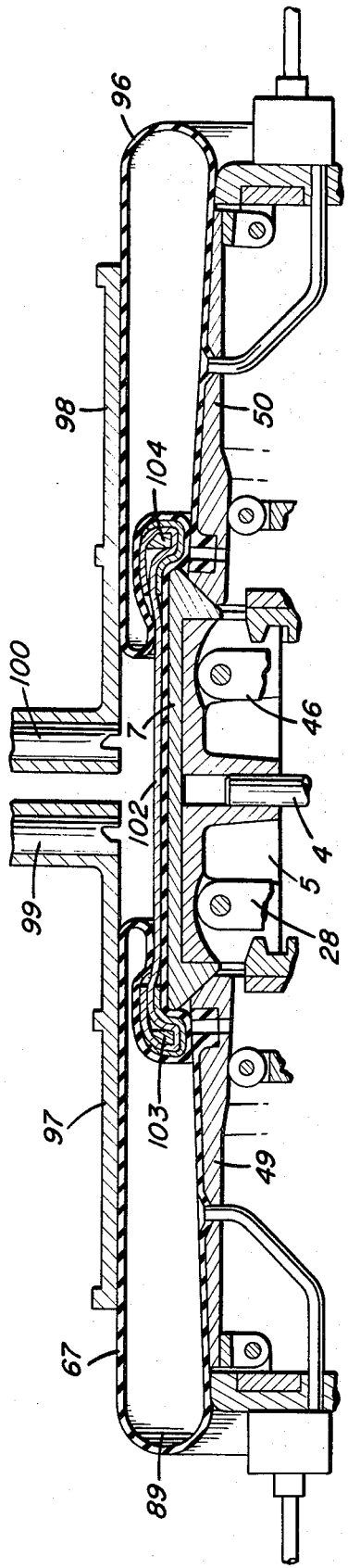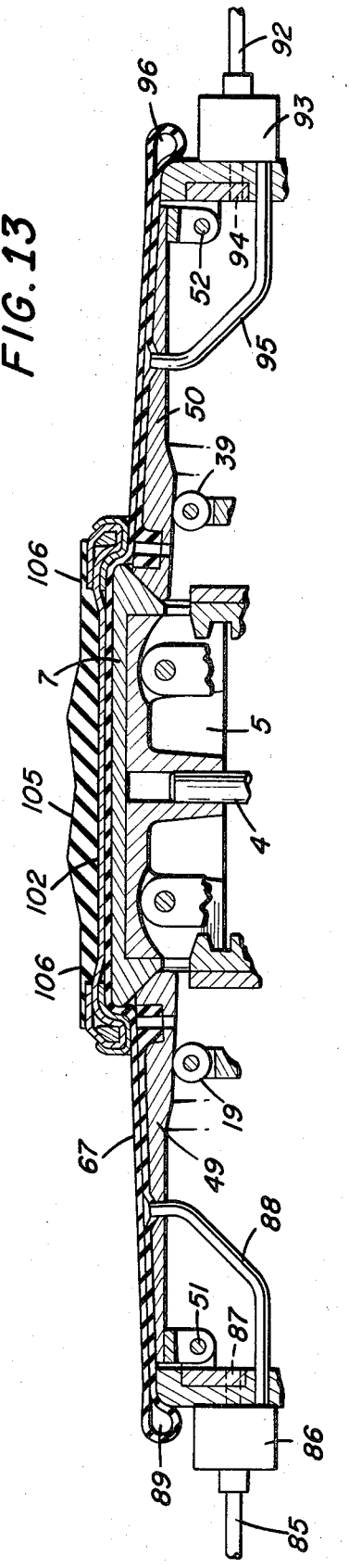

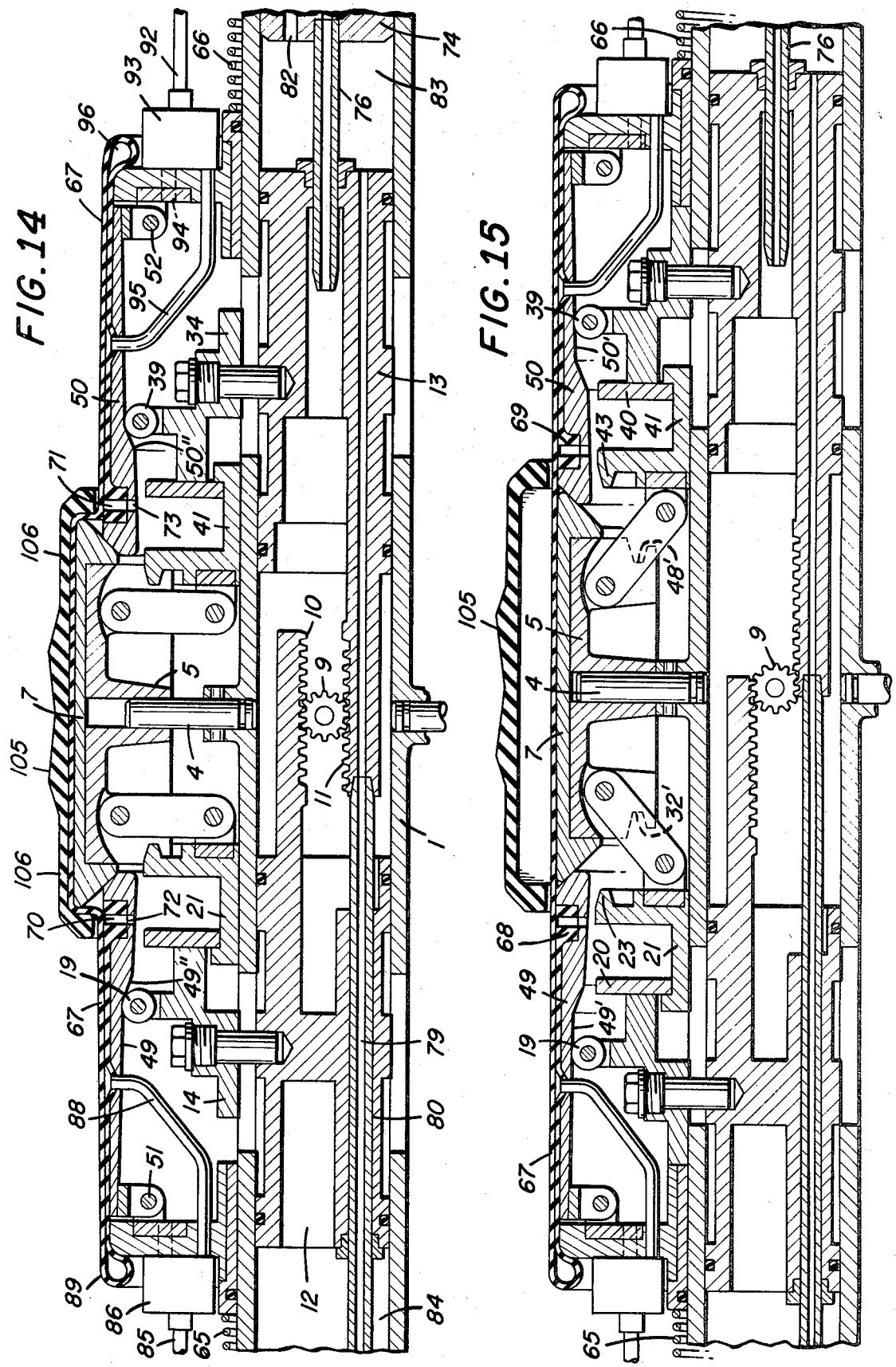

United States Patent Office 3,598,673
Patented Aug. 10, 1971

3,598,673
METHOD FOR BUILDING UP PNEUMATIC TIRES
Renato Caretta, Gallarate, Italy, assignor to
Pirelli S.p.A., Milan, Italy
Filed Dec. 26, 1967, Ser. No. 693,570
Claims priority, application Italy, Dec. 30, 1966,
31,734/66
Int. Cl. B29h 17/22
U.S. Cl. 156—132
12 Claims

ABSTRACT OF THE DISCLOSURE

A method for building up pneumatic tires in which the carcass plies are placed over a cylindrical central surface with side portions of the plies extending over cylindrical lateral surfaces to either end of the central surface. The bead cores are positioned over the side portions of the plies on the lateral surfaces and the central and lateral surfaces are expanded to their final position, and the latter also moved axially towards each other, for turning up the side portions of the plies and for positioning the tread band onto the carcass.

BACKGROUND OF THE INVENTION (1) Field of the invention

The present invention relates to the manufacture of pneumatic tires of conventional or radial carcass type, and, more particularly, to the manufacture of pneumatic tires utilizing a process that expands the carcass radially from a diameter smaller than the inner diameter of the tire beads to a diameter greater than the latter.

(2) Description of the prior art

A method for the manufacture of pneumatic tires is already known, according to which the carcass plies are applied on a drum having an outer diameter initially slightly smaller than the inner diameter of the tire beads. According to this method, the bead cores are positioned on the plies at a mutual distance corresponding to the one they must have at the end of the building of the carcass in cylindrical form, and are firmly fastened in said position after which the drum diameter is increased up to a value greater than that of the diameter of the tire beads, and the ply edges projecting from the bead cores are turned up about the latter.

In this known method, however, an uncontrolled sliding of the plies below and relative to the bead cores takes place when the drum diameter is increased, so that it is not possible to insure that the development of the plies between the bead cores is exactly according to the pre-established development.

According to another known method of manufacture, as shown in any of U.S. 3,078,204; 3,188,260; or 3,268,382, the carcass plies are applied on a drum having an outer diameter initially smaller than the inner diameter of the tire beads, after which the drum is expanded so as to impart to it a diameter greater than the latter. The bead cores are then applied on the vertical lateral bands of the drum and the ply edges projecting from the bead cores are turned up about the latter.

By means of this latter method, it is possible to prevent the plies from sliding below the bead cores, since they are applied to the plies after the latter have been expanded. However, the bead cores have a rather unstable support, which is insured only by their adhesion to the vertical band of the ply, so that they may become off-center.

SUMMARY OF THE INVENTION

The object of the present invention is a method for building up pneumatic tires which eliminates the drawbacks of the above-indicated methods.

Briefly summarized, the present invention relates to a method for building up pneumatic tires in which the carcass plies are placed over a cylindrical central surface with side portions of the plies extending over cylindrical lateral surfaces to either end of the central surfaces. The bead cores are applied over the side portions of the plies on the lateral surfaces and the central and lateral surfaces are radially expanded to a position approximately equal to the diameter of the tire beads. The central surface is then expanded further while the lateral surfaces move axially towards each other to prevent relative sliding movement between the bead cores and the plies.

BRIEF DESCRIPTION OF THE DRAWINGS

These and further features of the present invention will be more clearly apparent from the following description, made with reference to an embodiment illustrated by way of example in the attached drawings, in which:

FIG. 4 is a cross section taken along line 4—4 of FIG. 1;

FIG. 5 is a view similar to FIG. 4 but showing the central sectors in an expanded position;

FIG. 6 is a cross section taken along line 6—6 of FIG. 1;

FIG. 7 is a view similar to FIG. 6 but showing the central sectors in an expanded position; and FIGS. 8–15 represent the positions of the apparatus of FIGS. 1–7 in the various steps of the present invention for the manufacture of the tire and its removal from the apparatus, with FIGS. 11–13 being shown schematically to better emphasize the positions of the elements of the apparatus involved in carrying out the present invention

DESCRIPTION OF THE PREFERRED EMBODIMENTS

Figure 1:
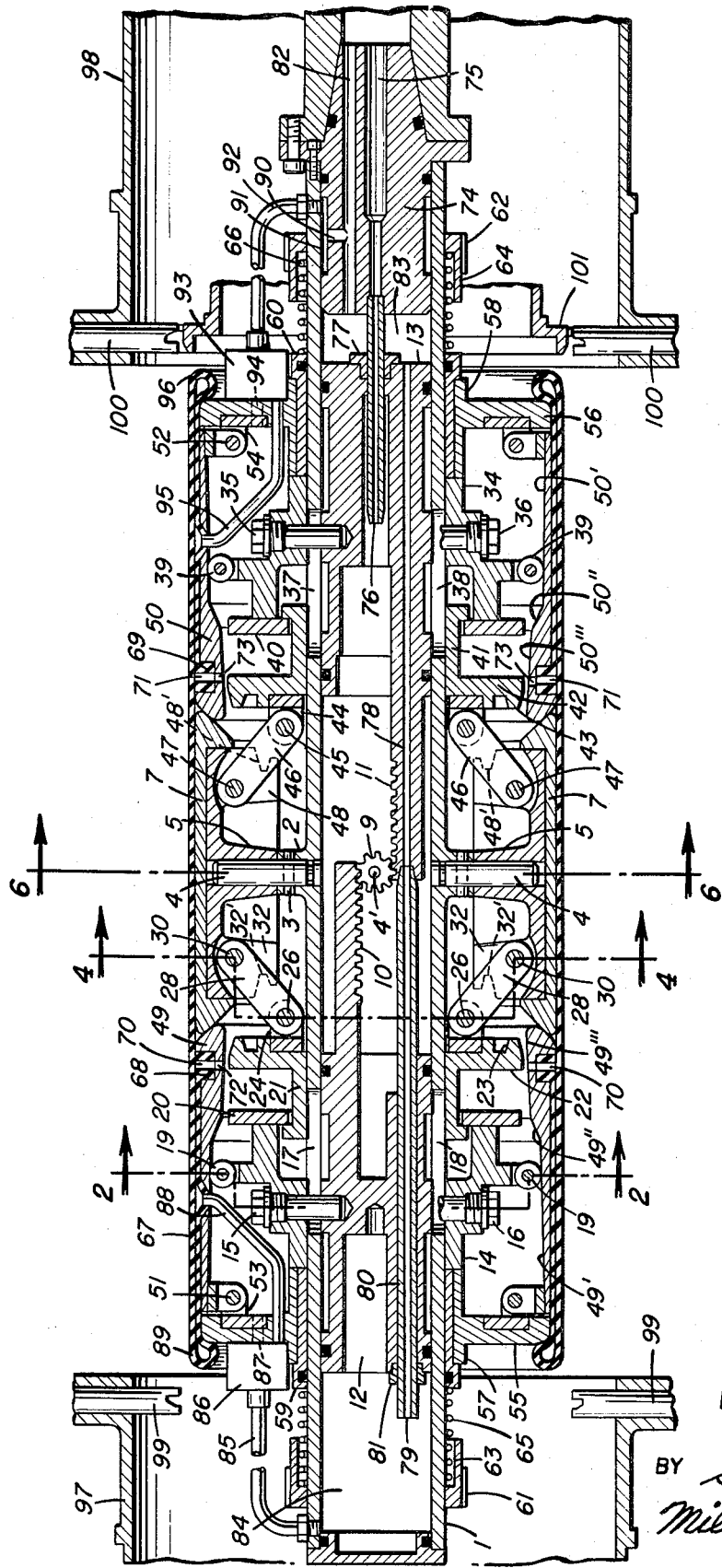
FIG. 1 is a vertical longitudinal section of an apparatus used with the present invention.

Referring to the drawings, and specifically to FIG. 1 thereof, the reference numeral 1 refers to a hollow shaft of a building drum, which shaft can be rotatably assembled in cantilever fashion, for example, on a frame of the type represented in applicant's U.S. Pats. 3,433,695 and 3,434,897, with the frame being to the right of the apparatus of the present invention as shown in FIG. 1.

To carry out the present invention, the shaft of the expansible drum disclosed in the above application is provided with a flange 2 in which are fastened, by means of pegs 3, the ends of a set of guide pins 4 on which are inserted the radial hollow extensions 5 and 6 of two sets of rigid arcuate sectors 7 and 8. As shown in FIGS. 4–7, sectors 7 are of a greater arcuate length than sectors 8, and the sectors 7 and 8 are alternately disposed to define the outer surface of the drum. Each lateral surface of the sectors 7 and 8 defines a frustum of a cone, the generatrices of which are convergent towards the drum midline as shown in FIG. 1.

The opposed guide pins 4' and 4" extend inside the hollow shaft 1 and support a pinion 9 engaging with a pair of racks 10 and 11, respectively, provided on the axially inner extension of pistons 12 and 13 slidably assembled inside the hollow shaft 1.

Piston 12 is fastened to a hub 14 by means of two opposed stud bolts 15 and 16 inserted in two corresponding longitudinal slots 17 and 18 formed diametrically opposite in shaft 1. The hub 14 is slidable along the shaft 1 and supports a set of small rollers 19 all at the same mutual distance, and a circular flange 20 coaxial with the drum shaft 1. Flange 20 is adapted to engage in a second adjacent hub 21, also slidable along the shaft 1 and provided with a circular flange 22 terminating in an annular wedge 23.

The hub 21 is provided with two sets of bifurcated brackets 24 and 25, as shown in FIGS. 4 and 5, which are directed towards the drum midline and carry two corresponding sets of pins 26 and 27. Links 28 and 29 are pivoted at one end on pins 26 and 27, and on the other end on pins 30 and 31 which are assembled in two corresponding sets of bifurcated brackets 32 and 33 integral with extensions 5 and 6 of sectors 7 and 8, respectively. Sectors 7 and 8 are respectively provided with seats 32' and 33' for the annular wedge 23 formed on circular flange 22.

The distance between the pivot points of the links 28, which are connected to the sectors 7 of greater arcuate length, is greater than the distance between the pivot points of the links 29, connected to the sectors 8 of smaller arcuate length. In this manner sectors 7 move a greater distance to and from shaft 1 than sectors 8 during the sliding of hub 21 along shaft 1, as will be explained in greater detail later.

In a similar manner to piston 12, the piston 13 is fastened to a hub 34 by means of two opposed stud bolts 35 and 36 inserted in two corresponding longitudinal slots 37 and 38 formed diametrically opposite in shaft 1. The hub 34 is slidable along shaft 1 and supports a set of small rollers 39, all at the same mutual distance, and a circular flange 40 coaxial with the drum shaft 1. Flange 40 engages in a second adjacent hub 41, also slidable along the shaft 1 and provided with a circular flange 42 terminating in an annular wedge 43.

The hub 41 is also provided with a linkage system similar to that of hub 21, only the components associated with sector 7 being shown and described, in the interest of simplicity. Specifically, bifurcated brackets 44 are provided on hub 41 and receive pins 45 to which one end of each link 46 is secured, only two brackets 44 and links 46 of one set being shown in FIG. 1. The other ends of links 46 are pivoted on pins 47 assembled on bifurcated brackets 48 integral with extension 5 of sector 7 and provided with seats 48' for the annular wedge 43. It is to be understood that a similar arrangement exists for the components associated with sectors 7 and the distance between the pivot points of links 46, which are connected to the sectors 7 of greater arcuate length is greater than the distance between the pivot points of the links (not represented in the drawings) connected to the sectors 8 of smaller arcuate length.

Two sets of circular sectors 49 and 50 of equal arcuate length are assembled at the two ends of the drum. One end of each of these sectors is pivoted on one of two sets of pins 51 and 52, assembled in the bifurcated brackets 53 and 54, the latter being supported by the flanges 55 and 56 of the hubs 57 and 58, respectively. These hubs are integral with sleeves 59 and 60, respectively, which are slidably assembled on the shaft 1.

The profile of each of the sectors 49 and 50, is divided in three sections 49', 49'', 49''', and 50', 50'', 50''', each pair having a different inclination. The other surface of the free end of said sectors defines a frusto-conical surface, the generatrices of which are convergent towards the shaft 1 and are parallel to the generatrices of the frusto-conical surfaces defined by the adjacent lateral surfaces of the sectors 7 and 8.

A pair of locking rings 61 and 62, screwed on the two ends of the shaft 1, form with the outer surface of said shaft a pair of seats 63 and 64 into which is inserted one end of a pair of compressed helical springs 65 and 66, the other ends of which engage sleeves 59 and 60 in order to urge the free end of the sectors 49 and 50 in constant contact with the adjacent ends of the sectors 7 and 8, respectively.

The assembly formed by the sectors 7 and 8 of the drum and by the lateral sectors 49 and 50 is covered with an elastic tubular membrane 67, which is impermeable and is stretched before assembly onto the sectors to insure the constant engagement of the small rollers 19 and 39 against the inner surface of the sectors 49 and 50 and the tightnes of sectors 7, 8, 49 and 50. The ends of membrane 67 are turned under and provided with two thickened portions 68 and 69, which extend into suitable recesses formed on the outer face of the sectors 49 and 50. Each thickened portion is provided with a set of radial holes 70 and 71 which extend towards the shaft 1 and register with a corresponding set of holes 72 and 73 formed in the sectors 49 and 50.

A frusto-conical plug member 74 is tightly inserted in the right end of the shaft 1, and has an axial duct 75 formed therethrough. A tube 76 extends into duct 75 and is assembled in the piston 13 through a centering member 77. The piston 13 is also provided with a duct 78 connected to a tube 79 slidably assembled in a longitudinal hole 80 formed in the piston 12, a centering element 81 being secured to the outer end of said piston 12.

A duct 82, passing through the frusto-conical plug member 74, opens into a chamber 83 communicating, by means of a duct 78 and tube 79, with a chamber 84. The latter chamber is connected, by means of a tube 85, with a chamber 86 assembled on the hub 57 and provided with a first valve situated at the entrance of the hole 87 which communicates with the space defined within the sectors 49 and opens only when a suction is created in the chamber 86, and a second valve at the entrance of the tube 88. This latter valve communicates, through tube 88, with the bend 89 formed by the folded over membrane 67, and permits the passage of compressed fluid into the bend 89 when the pressure of the fluid in the chamber 86 exceeds a pre-established value, as well as the subsequent discharge of the fluid from chamber 86.

A radial branch 90 of duct 82 opens in an annular chamber 91, connected through a tube 92 to a chamber 93 assembled on hub 58. Chamber 93 is provided with a first valve situated at the entrance of hole 94 which communicates with the space defined within sectors 50, and opens only when a suction is created in the chamber 93. Chamber 93 is also provided with a second valve at the entrance of the tube 95, which valve communicates with the bend 96 formed by the membrane 67 over the sectors 50, and permits the passage of compressed fluid in the bend 96 when the pressure of the fluid in the chamber 93 exceeds a pre-established value, as well as the subsequent discharge of the fluid in the chamber 93.

Two rigid cylinders 97 and 98 are shown at each side of the apparatus in FIG. 1 and may be of the same general type as described in applicant's above-cited U.S. patents. Each cylinder is provided with a plurality of fingers 99 and 100, radially displaceable in the two directions and used for applying the bead cores on the carcass plies.

A fixed ring 101 is associated with cylinder 98 and is adapted to temporarily support the bead core which is to be applied on the side nearest to the supporting frame of the shaft 1, or on the right side of the apparatus as shown in FIG. 1. Although an analogous ring is provided on the left-hand side of the apparatus, it is at a greater distance from the drum to allow the passage of an operator and is therefore not shown in the figure.

The operation of the apparatus in carrying out the method will now be described with reference to FIGS. 8–15.

Figure 2:
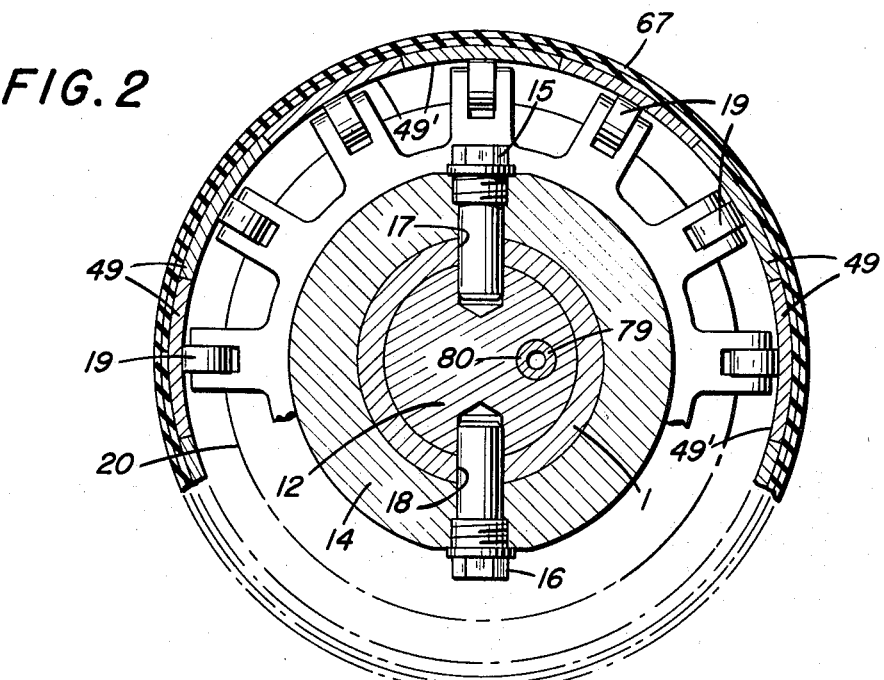
FIG. 2 is a cross section taken along line 2—2 of FIG. 1.
Figure 3:
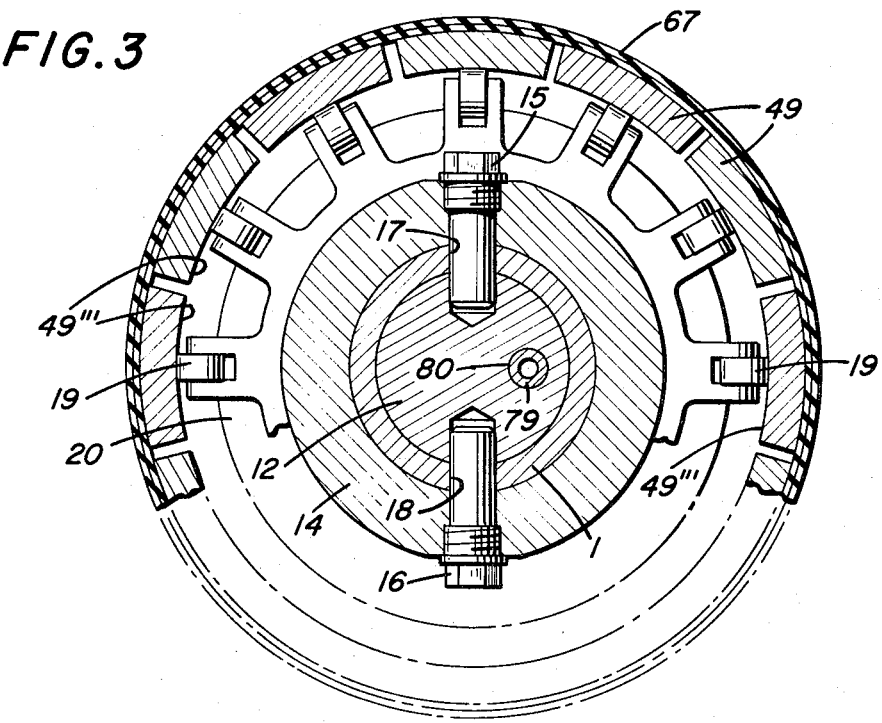
FIG. 3 is a view similar to FIG. 2 but showing the oscillating sectors in an expanded position.

In FIG. 8 the building drum is in a collapsed position and the sectors 49 and 50, together with sectors 7, form a practically cylindrical assembly having an outer rigid continuous surface as shown in FIGS. 2, 4, and 6, with sectors 8 being positioned closer to the shaft 1 than sectors 7.

The duct 82 is put into communication with a vacuum pump, so that the passages 87 and 94 of the chambers 86 and 93, respectively, are opened and a suction is exerted from the outside to the inside through holes 70 and 71 in the membrane and through holes 72 and 73 in the oscillating sectors. Therefore, the sides of carcass plies 102 are retained on the membrane over sectors 49 and 50 while the plies are wound about the drum.

Then the rigid cylinders 97 and 98, carrying the bead cores 103 and 104 are symmetrically moved towards the drum midline until they have reached their pre-established position as shown in FIG. 9, in which position the bead cores are spaced apart a distance greater from each other than the distance they will assume at the end of the building operation.

The duct 82 is then detached from the vacuum pump and compressed fluid is admitted through said duct. This fluid penetrates in the chamber 83, and reaches the chamber 84 through duct 78 and tube 79, from which it passes through tube 85, into chamber 86. The fluid also passes through the radial branch 90 of the duct 82, into annular chamber 91, and through tube 92 into chamber 93, the pressure of the fluid not being great enough at this time to open the valves at the entrance to tubes 88 and 95. However, the fluid does act on the axial outer faces of the pistons 12 and 13 to cause their mutual approach and a corresponding movement of racks 10 and 11 on pinion 9 to insure a symmetrical displacement of the pistons. Therefore, the hubs 14 and 34, which are connected to their respective cylinders as described above, are moved in a similar direction, along with rollers 19 and 39 and rings 20 and 40 carried by the hubs.

As the small rollers 19 and 39 roll along the sections 49', 49'' and 50', 50'' of the inner profile of the oscillating sectors 49 and 50, the latter are caused to rotate about the pins 51 and 52, respectively, and their free ends are displaced radially outwardly. As a result, sectors 7 and 8 are pushed by the sectors 49 and 50 radially outwardly so that the inclined links 28 and 46, respectively, associated with sectors 7 and 8, are partially straightened up. In a similar manner, the links connected to these hubs and to the brackets integral with the sectors 8 are also partially straightened up.

When the circular flanges 20 and 40 come into contact with the flanges 22 and 42 of the hubs 21 and 41 as shown in FIG. 9, the flanges push their respective hubs towards the drum midline, and consequently also push the two sets of pins assembled on the hubs so that the links which connect the hubs 21 and 41 to the extensions 5 and 6 of sectors 7 and 8 are progressively straightened up, thus causing the sectors to move radially outwardly from shaft 1. Since the pivot points of the links associated with sectors 7 is greater than the distance between the pivot points of the links associated with sectors 8, the latter move a greater distance with respect to the former, and both expand simultaneously with the lateral sectors 49 and 50. The arrangement is such that the sectors 7, 8, 49, and 50 each take a diameter substantially corresponding to the inner diameter of the bead cores 103 and 104 when the small rollers 19 and 39 come into contact with the sections 49''' and 50''' of the inner profile of the sectors 49 and 50, this exact position being between the position shown in FIG. 9 and the position shown in FIG. 10. At this moment the bead cores 103 and 104 are firmly secured to the carcas plies 102, and fingers 99 and 100 are radially detached from the corresponding bead cores. Further similar movement of hubs 21 and 41 causes sectors 7 and 8 to expand until the racks 10 and 11 have reached their limit position, as shown in FIG. 10.

In this latter position, the annular wedges 23 and 43 are completely engaged in the seats 32' and 48', insuring that the sectors 7 and 8 have reached the radially outermost pre-established position, in which they define a continuous cylindrical surface as shown in FIGS. 5 and 7, and that they maintain said position permanently for the tire building operation.

During the passage of the drum sectors from a diameter corresponding to the inner diameter of the tire beads to the maximum pre-established diameter, the axially innermost ends of the sectors 49 and 50, which are constantly engaged on the lateral surfaces of the drum, slide along said surfaces, while sectors 49 and 50 move axially to symmetrically approach the drum midline due to the action of springs 65 and 66 on their corresponding sleeves 59 and 60. This axial movement of sectors 49 and 50 towards the drum midline prevents a relative sliding between the plies and the bead cores despite the additional outward movement of sectors 7 and 8, and the initial spacing of the bead cores 103 and 104 is such that, at the end of the expansion of the drum sectors, the bead cores are exactly at the mutual distance corresponding to the drum setting.

The expansion of the drum sectors and consequently the expansion of the plies applied to it results in the plies being compact and devoid of air inclusions, thus eliminating the necessity to stitch them.

At this moment a fluid under a higher pressure than that previously used and sufficient enough to open the valves at the entrance of the tubes 88 and 95 is admitted through the duct 82. The pistons 12 and 13 remain in the same position, since the racks 10 and 11 have already reached their limit position.

The compressed fluid pentrates in the bends 89 and 96 of the membrane 67, which are tightly separated from the central portion of the membrane by means of the bead cores 103 and 104. Therefore, these bends expand and engage the inner surface of the rigid cylinders 97 and 98, lifting the edges of the plies which protrude from the bead cores, as shown in FIG. 11.

The rigid cylinders 97 and 98 are then symmetrically displaced from the point at which they had applied the bead cores towards the drum midline, thus completing the turn up of the edges of the plies 102 about the bead cores, as shown in FIG. 12.

The rigid cylinders 97 and 98 are then brought to the same position they assumed at the start of the operation, and the compresed fluid is discharged from the lateral bends 89 and 96 of the membrane through the duct 82. The tread band 105 and the sidewalls 106 are then applied on the carcass as shown in FIG. 13.

To remove the finished tire from the drum, compressed fluid is admitted, through the duct 75 and the tube 76, to the inner portion of the shaft 1 defined by the pistons 12 and 13 which causes the mutual displacement of the pistons 12 and 13. This, in turn, causes the small rollers 19 and 39 to be again brought into contact with the sections 49'' and 50'' of the inner profile of the sectors 49 and 50. The free ends of sectors 49 and 50 thus rotate about pins 51 and 52 towards the shaft 1, and are displaced by the helical springs 65 and 66 towards the drum midline to engage with a portion of the lateral surfaces of the sectors 7 and 8 nearer to the shaft 1, as shown in FIG. 14.

Further movement of pistons 12 and 13 causes hubs 14 and 34, and therefore hubs 21 and 41, respectively, to move away from the drum midline thus disengaging annular wedges 23 and 43 from their seats 32' and 48' and causing sectors 7 and 8 to move radially towards the shaft 1.

In this manner the sectors 7 again form a continuous surface, as shown in FIGS. 4 and 6, while the sectors 8 take a position nearer to the shaft 1 due to the difference in the distances between the pivot points of their respective links. The sectors 49 and 50, due to the collapse of the drum and the passage of the small rollers 19 and 39 into contact with the profiles 49' and 50', are again moved away from the drum midline opposing the action of the helical springs 65 and 66, as shown in FIG. 15. The finished tire may then be easily removed from the drum.

It is understood that the inventive principle remaining unvaried, the details of the method and apparatus may be widely varied with respect to what has been described and illustrated only by way of nonlimiting example, without falling out of the scope of the present invention.

For example, the cylindrical central surface may be of the expansible type and constituted by two rigid circular sidewalls, each provided with an undercut, and by a tubular expansible membrane having its edges secured to the sidewalls, each provided with an undercut, and by a tubular a pre-established maximum diameter. Consequently, the cylindrical lateral surfaces situated at the sides of the central surface may also be constituted by analogous expansible surfaces in which the sidewall directed towards the central surface may be provided with a projection corresponding to the undercut of the surface in order to allow a mutual approach of the lateral cylindrical surfaces to the central surface. Moreover, the central surface may expand only to engage against the radially inner surface of the bead cores.

Instead of axially displacing both cylindrical lateral surfaces with respect to the central surface, one of them may be kept stationary and the other may be displaced axially and simultaneously with the central surface, but at a double speed.

Also, the central surface may have a continuous rigid surface only for a single pre-established diameter, the surface may be constituted by sectors all having the same width, and the lateral cylindrical surfaces may have a discontinuous rigid surface for any diameter.

It is clear from the above description that the method of the present invention offers several remarkable advantages, especially in respect to accurate tire manufacture, which is growing increasingly important due to the increase in tire service speeds. For example, by causing the uniform expansion of the plies for their whole circumferential length and axial width until they reach a diameter corresponding to the inner diameter of the tire beads, the plies remain perfectly centered on the drum during the whole expansion, and therefore, the cords contained in the plies vary their inclination in a uniform way for the whole length of the plies.

Also, the bead cores, when applied over the plies, remain perfectly centered and firmly secured to them so as not to suffer any accidental axial displacement. This is possible due to the fact that the bead cores are supported on their radially inner face by rigid elements which expand in a uniform centered manner, with the interposition of an elastic membrane between the bead cores and the support.

Also, during the further expansion of the plies extending between the bead cores, no sliding of the plies under the latter may take place, because the bead cores move, together with their supports, progressively and symmetrically towards the central surface, so that the final mutual distance between the bead cores, corresponding to the central surface radial displacement, differs from the initial distance only for a length corresponding to the variation of diameter of the central surface during its expansion beyond the inner diameter of the tire beads.

Moreover, by means of the method of the present invention, the stitching of the plies and their turn down are eliminated, since these operations are advantageously replaced by the single operation of expanding the central surface from the value of the inner diameter of the beads to the pre-established maximum diameter. Also, for the turn up of the plies about the bead cores, it is possible to use the same membrane which serves to insure the air tightness between the central surface and lateral surfaces and also the constant engagement of the two sets of small rollers against the inner profile of the lateral surfaces.

Of course, further variations of the specific disclosed herein can be made by those skilled in the art without departing from the invention as defined in the appended claims:

What is claimed is:

1. A method for building up pneumatic tires, which comprises the steps of applying at least one carcass ply on a substantially cylindrical central surface so that the side portions of the ply protrude beyond the sides of said central surface, supporting each of said side portions of said ply on separate substantially cylindrical lateral surface having a diameter approximately equal to the diameter of said central surface; applying a pair of bead cores over said side portions of said ply and over a corresponding portion of said lateral surfaces in such a manner that the initial distance between the bead cores is greater than at then end of the building of the carcass in cylindrical form; bringing the central surface and at least said portion of said lateral surfaces to a greater diameter corresponding to the inner diameter of the tire beads in order to firmly engage the radial inner surface of the bead cores over said side portions of said plies, and then bringing said central surface to a diameter greater than the inner diameter of the tire beads, while mutually approaching said portions of said lateral surfaces so that the bead cores and ply reach their final positions simultaneously.

2. A method as in claim 1, wherein said central surface and at least said corresponding portion of said lateral surfaces are initially radially expanded simultaneously to reach a diameter substantially equal to the inner diameter of the bead cores.

3. A method as in claim 1, wherein each ply applied on said surfaces is expanded uniformly for its entire circumferential length and axial width from a diameter smaller than the inner diameter of the bead core to a diameter equal to it.

4. A method as in claim 1, wherein each bead core, after being firmly engaged over said ply, is displaced towards the other bead core a distance corresponding to one half of the difference between the maximum diameter reached by the ply on the central surface during its second expansion and the inner diameter of the bead core.

5. A method as in claim 1, wherein the plies are kept fixed with respect to said central and said lateral surfaces at the beginning of the building up operation by means of a suction carried out from the inside of said cylindrical lateral surfaces.

6. A method for building up pneumatic tires comprising the steps of applying at least one carcass ply on a substantially cylindrical central surface so that the side portions of said ply protrude beyond the sides of said central surface, supporting said side portions of said ply on a pair of substantially cylindrical lateral surfaces to either end of said cylindrical surface, applying a bead core over each of said side portions of said ply, expanding said surfaces radially simultaneously and equally until they reach a diameter at least as large as the inner diameter of the tire beads, further expanding said central surface a predetermined amount while simultaneously axially moving said lateral surfaces towards each other to prevent relative movement between said bead cores and said ply.

7. A method for building up pneumatic tires comprising the steps of applying at least one carcass ply around an axially segmented cylindrical surface so that the central portion of said ply is supported over the center segment of said surface and each peripheral portion of said ply extends equally over the supporting surface of the segment on each side of said center segment, all of said segments having equal outside diameters when said ply is applied, applying a negative pressure to the underside of each peripheral portion to hold said ply securely against said surfaces, positioning an annular bead core concentrically around each peripheral portion at a predetermined radial distance therefrom, radially expanding said peripheral portions and said central portion of said ply simultaneously and equally a first distance to bring said peripheral portion of said ply into frictionally locking engagement with the inner surfaces of said cores, radially expanding said central portion of said ply an additional predetermined distance while maintaining each of said peripheral portions of said ply at said first radially expanded position and simultaneously axially displacing each of said peripheral portions and frictionally engaged cores equally toward each other a predetermined distance, maintaining said central portion of said ply in said second radially expanded position and said peripheral portions in said first radially expanded position and said axially displaced position, folding the peripheral edges of each peripheral portion extending axially outwardly from said core around said core into sealing contact with the outer surface of said ply.

8. The method according to claim 7 wherein said first distance of radial expansion is not less than one-half the difference between the inner diameter of said annular bead core and the outside diameter of said at least one carcass ply applied around said cylindrical surface.

9. The method according to claim 7 wherein said additional distance of radial expansion of said central portion and the distance of the simultaneous axial displacement toward each other of said peripheral portions with said bead cores frictionally engaged therewith are of equal value.

10. The method according to claim 7 wherein said peripheral edges of said peripheral portions of said at least one carcass ply are folded around said bead cores by the simultaneous peripheral application of two equal axial pressures directed toward each other and applied in a rolling-up manner.

11. The method according to claim 10 wherein said at least one carcass ply is applied over an air impermeable flexible membrane positioned around said axially segmented cylindrical surface, the said membrane being formed as a separate inflatable toroid over each of said segmented surfaces adjacent said center surface, each of said toroids in part lying under the respective said peripheral portion on said adjacent surface.

12. The method according to claim 11 wherein each of said toroids is inflated to a predetermined degree to lift each said peripheral edge from its associated segmented surface, each said so inflated toroid then being moved toward the other to fold said peripheral edge over said respective bead core.

References Cited

UNITED STATES PATENTS

| | | | |
|---|---|---|---|
| 3,078,204 | 2/1963 | Appleby | 156—132 |
| 3,127,294 | 3/1964 | Porter | 156—401 |
| 3,188,260 | 6/1965 | Nebout | 156—401 |
| 3,268,382 | 8/1966 | Urbon | 156—401 |
| 3,433,695 | 3/1969 | Caretta et al. | 156—401 |
| 3,434,897 | 3/1969 | Caretta et al. | 156—401 |

SAMUEL FEINBERG, Primary Examiner

S. C. BENTLEY, Assistant Examiner